(12) United States Patent
Jeong et al.

(10) Patent No.: US 8,456,508 B2
(45) Date of Patent: *Jun. 4, 2013

(54) AUDIO PROCESSING IN A MULTI-PARTICIPANT CONFERENCE

(75) Inventors: Hyeonkuk Jeong, San Jose, CA (US); Ryan Salsbury, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 12/955,902

(22) Filed: Nov. 29, 2010

(65) Prior Publication Data

US 2011/0074914 A1   Mar. 31, 2011

Related U.S. Application Data

(63) Continuation of application No. 11/118,555, filed on Apr. 28, 2005, now Pat. No. 7,864,209.

(51) Int. Cl.
*H04N 7/15* (2006.01)

(52) U.S. Cl.
USPC .................................. 348/14.08; 379/206.01

(58) Field of Classification Search
USPC .......... 348/14.08, 14.09; 379/202.01, 206.01; 370/260, 266–269
See application file for complete search history.

(56) References Cited

U.S. PATENT DOCUMENTS

| | | | |
|---|---|---|---|
| 4,847,829 A | 7/1989 | Tompkins et al. | |
| 5,392,285 A | 2/1995 | Kurts | |
| 5,513,182 A | 4/1996 | Kawamura et al. | |
| 5,533,112 A | 7/1996 | Danneels | |
| 5,548,346 A | 8/1996 | Mimura et al. | |
| 5,604,738 A | 2/1997 | Shibata et al. | |
| 5,646,678 A | 7/1997 | Bonja et al. | |
| 5,838,664 A | 11/1998 | Polomski | |
| 5,896,128 A | 4/1999 | Boyer | |
| 5,936,662 A | 8/1999 | Kim et al. | |
| 5,953,049 A | 9/1999 | Horn et al. | |
| 6,008,838 A | 12/1999 | Iizawa | |
| 6,167,033 A | 12/2000 | Chang et al. | |
| 6,167,432 A | 12/2000 | Jiang | |
| 6,624,841 B1 | 9/2003 | Buchner et al. | |
| 6,633,985 B2 | 10/2003 | Drell | |
| 6,697,341 B1 | 2/2004 | Roy | |

(Continued)

FOREIGN PATENT DOCUMENTS

| EP | 0744857 | 11/1996 |
|---|---|---|
| EP | 1875769 | 1/2008 |

(Continued)

OTHER PUBLICATIONS

Updated portions of prosecution history of U.S. Appl. No. 11/118,932, Jun. 13, 2012, Abuan, Joe, et al.

(Continued)

*Primary Examiner* — Stella Woo
(74) *Attorney, Agent, or Firm* — Fletcher Yoder PC (57) ABSTRACT

Some embodiments provide an architecture for establishing multi-participant audio conferences over a computer network. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

20 Claims, 9 Drawing Sheets

U.S. PATENT DOCUMENTS

| | | | |
|---|---|---|---|
| 6,697,476 | B1 | 2/2004 | O'Malley et al. |
| 6,711,212 | B1 | 3/2004 | Lin |
| 6,728,221 | B1 | 4/2004 | Shaffer et al. |
| 6,744,460 | B1 | 6/2004 | Nimri et al. |
| 6,757,005 | B1 | 6/2004 | Elbaz et al. |
| 6,760,749 | B1 | 7/2004 | Dunlap et al. |
| 6,882,971 | B2 | 4/2005 | Craner |
| 6,915,331 | B2 | 7/2005 | Fuller et al. |
| 6,989,856 | B2 | 1/2006 | Firestone et al. |
| 7,096,037 | B2 | 8/2006 | Canova, Jr. et al. |
| 7,266,091 | B2 | 9/2007 | Singh et al. |
| 7,280,492 | B2 | 10/2007 | Magnuski |
| 7,313,593 | B1 | 12/2007 | Pulito et al. |
| 7,321,382 | B2 | 1/2008 | Okajima et al. |
| 7,328,240 | B2 | 2/2008 | El-Gebaly et al. |
| 7,362,349 | B2 | 4/2008 | Nelson et al. |
| 7,421,471 | B2 | 9/2008 | Van Datta |
| 7,454,460 | B2 | 11/2008 | Ivashin |
| 7,474,326 | B2 | 1/2009 | Le Pennec |
| 7,474,634 | B1 | 1/2009 | Webster et al. |
| 7,492,387 | B2 | 2/2009 | Yang et al. |
| 7,606,181 | B1 | 10/2009 | Whynot et al. |
| 7,627,678 | B2 | 12/2009 | Van Datta et al. |
| 7,653,250 | B2 | 1/2010 | Jeong et al. |
| 7,692,682 | B2 | 4/2010 | Pun et al. |
| 7,817,180 | B2 | 10/2010 | Jeong et al. |
| 7,864,209 | B2 * | 1/2011 | Jeong et al. ............... 348/14.08 |
| 7,881,235 | B1 | 2/2011 | Arthur et al. |
| 7,899,170 | B2 | 3/2011 | Jeong et al. |
| 7,949,117 | B2 | 5/2011 | Jeong et al. |
| 2001/0019354 | A1 | 9/2001 | Einarsson et al. |
| 2002/0126626 | A1 | 9/2002 | Singh et al. |
| 2002/0154210 | A1 | 10/2002 | Ludwig et al. |
| 2003/0217158 | A1 | 11/2003 | Datta |
| 2004/0022202 | A1 | 2/2004 | Yang et al. |
| 2004/0028199 | A1 | 2/2004 | Carlson |
| 2004/0215722 | A1 | 10/2004 | Mukherjee |
| 2005/0018828 | A1 | 1/2005 | Nierhaus et al. |
| 2005/0086273 | A1 | 4/2005 | Loebbert et al. |
| 2005/0097169 | A1 | 5/2005 | Mukherjee et al. |
| 2005/0099492 | A1 | 5/2005 | Orr |
| 2005/0286443 | A1 | 12/2005 | McMillen et al. |
| 2006/0029092 | A1 | 2/2006 | Luo et al. |
| 2006/0146737 | A1 | 7/2006 | Ohrstrom Sandgren et al. |
| 2006/0187860 | A1 | 8/2006 | Li |
| 2006/0245377 | A1 | 11/2006 | Jeong et al. |
| 2006/0245378 | A1 | 11/2006 | Jeong et al. |
| 2006/0245379 | A1 | 11/2006 | Abuan et al. |
| 2010/0017606 | A1 | 1/2010 | Bradley et al. |
| 2010/0189178 | A1 | 7/2010 | Pun et al. |
| 2010/0321469 | A1 | 12/2010 | Jeong et al. |
| 2011/0116409 | A1 | 5/2011 | Jeong et al. |
| 2011/0205332 | A1 | 8/2011 | Jeong et al. |

FOREIGN PATENT DOCUMENTS

| | | |
|---|---|---|
| EP | 1877148 | 1/2008 |
| EP | 1878229 | 1/2008 |
| EP | 1936996 | 6/2008 |
| EP | 11192109 | 12/2011 |
| EP | 11192110 | 12/2011 |
| EP | 2439945 | 4/2012 |
| EP | 12164796 | 4/2012 |
| EP | 2457625 | 5/2012 |
| GB | 1342781 | 1/1974 |
| GB | 2313250 | 11/1997 |
| JP | 2001-128132 | 5/2001 |
| WO | WO 99/62259 | 12/1999 |
| WO | WO 2006/116644 | 11/2006 |
| WO | WO 2006/116659 | 11/2006 |
| WO | WO 2006/116750 | 11/2006 |

OTHER PUBLICATIONS

Portions of prosecution history of U.S. Appl. No. 12/870,780, Jun. 13, 2012, Jeong, Hyeonkuk, et al.
Updated portions of prosecution history of U.S. Appl. No. 12/702,287, May 25, 2012, Pun, Thomas, et al.
U.S. Appl. No. 13/543,733, filed Jul. 6, 2012, Jeong, Hyeonkuk, et al.
Updated portions of prosecution history of U.S. Appl. No. 13/011,848, Jun. 27, 2012, Jeong, Hyeonkuk, et al.
Updated portions of prosecution history of U.S. Appl. No. 13/099,331, Jul. 9, 2012, Jeong, Hyeonkuk, et al.
Updated portions of prosecution history of U.S. Appl. No. 12/870,780, Jul. 10, 2012, Jeong, Hyeonkuk, et al.
Updated portions of prosecution history of U.S. Appl. No. 12/702,287, Jul. 19, 2012, Pun, Thomas, et al.
Portions of prosecution history of EP12164796, Jun. 27, 2012, Apple Inc.
Portions of prosecution history of U.S. Appl. No. 13/099,331, Jun. 2, 2011, Jeong, Hyeonkuk, et al.
Updated portions of prosecution history of EP06758716, Jun. 28, 2011 (mailing date), Apple Inc.
Updated portions of prosecution history of EP08075236, Jun. 28, 2011 (mailing date), Apple Inc.
Thom, Gary A., "H.323: The Multimedia Communications Standard for Local Area Networks," Dec. 1996, pp. 52-56, IEEE Communications Magazine.
Portions of prosecution history of U.S. Appl. No. 12/702,287, Feb. 3, 2012, Pun, Thomas, et al.
Updated portions of prosecution history of EP06769904, Dec. 27, 2011 (mailing date), Apple Inc.
Portions of prosecution history of EP11192107, Mar. 8, 2012 (mailing date), Apple Inc.
Updated portions of prosecution history of EP06758716, Jan. 25, 2012 (filing date), Apple Inc.
Updated portions of prosecution history of EP08075236, Jan. 26, 2012 (filing date), Apple Inc.
Pulkki, Ville, "Spatial Sound Generation and Perception by Amplitude Panning Techniques," Jan. 1, 2001, 60 pages, Helsinki University of Technology, Department of Technical Physics—Dissertation.
U.S. Appl. No. 13/099,331, filed May 2, 2011, Jeong, Hyeonkuk, et al.
Updated portions of prosecution history of U.S. Appl. No. 11/118,297, Apr. 21, 2011, Jeong, Hyeonkuk, et al.
Updated portions of prosecution history of EP06769904.1, Feb. 23, 2011 (mailing date), Apple Inc.
Updated portions of prosecution history of EP6758716.2, May 19, 2011 (mailing date), Apple Inc.
Portions of prosecution history of EP08075236.3, Mar. 10, 2011 (mailing date), Apple Inc.
Portions of prosecution history of U.S. Appl. No. 13/011,848, Mar. 29, 2012, Jeong, Hyeonkuk, et al.
Updated portions of prosecution history of U.S. Appl. No. 13/099,331, Apr. 2, 2012, Jeong, Hyeonkuk, et al.
Updated portions of prosecution history of U.S. Appl. No. 12/702,287, May 3, 2012, Pun, Thomas, et al.
Portions of prosecution history of EP11192110, Apr. 25, 2012 (mailing date), Apple Inc.
U.S. Appl. No. 10/877,207, filed Jun. 25, 2004, Arthur, Bruce, et al.
U.S. Appl. No. 13/011,848, filed Jan. 21, 2011, Jeong, Hyeonkuk, et al.
Portions of prosecution history of U.S. Appl. No. 11/118,931, Jan. 14, 2011, Jeong, Hyeonkuk, et al.
Portions of prosecution history of U.S. Appl. No. 11/118,554, Dec. 9, 2009, Jeong, Hyeonkuk, et al.
Portions of prosecution history of U.S. Appl. No. 11/118,932, Mar. 24, 2010, Abuan, Joe, et al.
Portions of prosecution history of U.S. Appl. No. 11/118,555, Dec. 2, 2010, Jeong, Hyeonkuk, et al.
Portions of prosecution history of U.S. Appl. No. 11/118,297, Jan. 11, 2011, Jeong, Hyeonkuk, et al.
Portions of prosecution history of U.S. Appl. No. 11/118,553, Sep. 21, 2010, Jeong, Hyeonkuk, et al.
Portions of prosecution history of U.S. Appl. No. 11/118,615, Feb. 16, 2010, Pun, Thomas, et al.
Portions of prosecution history of U.S. Appl. No. 12/702,287, Nov. 5, 2010, Pun, Thomas, et al.
International Preliminary Report on Patentability for PCT/US2006/016123, Apr. 28, 2009 (issuance date), Apple Computer, Inc.
International Search Report and Written Opinion of PCT/US2006/016123, Sep. 26, 2008 (mailing date), Apple Computer, Inc.

Portions of prosecution history of EP06769904.1, Aug. 10, 2009 (mailing date), Apple Inc.
International Search Report and Written Opinion for PCT/US2006/016469, Sep. 18, 2006 (mailing date), Apple Computer, Inc.
International Preliminary Report on Patentability for PCT/US2006/016469, Oct. 30, 2007 (issuance date), Apple Computer, Inc.
Portions of prosecution history of EP06751923.1, Feb. 18, 2010 (mailing date), Apple Inc.
International Search Report and Written Opinion for PCT/US2006/016169, Sep. 16, 2008 (mailing date), Apple Computer, Inc.
International Preliminary Report on Patentability PCT/US2006/016169, Dec. 11, 2008 (mailing date), Apple Computer, Inc.
Portions of prosecution history of EP06758716.2, Mar. 31, 2008 (mailing date), Apple, Inc.

* cited by examiner

AUDIO PROCESSING IN A MULTI-PARTICIPANT CONFERENCE

CLAIM OF BENEFIT TO PRIOR APPLICATIONS

This application is a continuation application of U.S. patent application Ser. No. 11/118,555, entitled "Audio Processing in a Multi-Participant Conference," filed Apr. 28, 2005, now published as U.S. Publication 2006/0247045. U.S. Publication 2006/0247045 is incorporated herein by reference.

FIELD OF THE INVENTION

The present invention relates to audio processing in a multi-participant conference.

BACKGROUND OF THE INVENTION

With proliferation of general-purpose computers, there has been an increase in demand for performing conferencing through personal or business computers. In such conferences, it is desirable to identify quickly the participants that are speaking at any given time. Such identification, however, becomes difficult as more participants are added, especially for participants that only receive audio data. This is because prior conferencing applications do not provide any visual or auditory cues to help identify active speakers during a conference. Therefore, there is a need in the art for conferencing applications that assist a participant in quickly identifying the active speaking participants of the conference.

SUMMARY OF THE INVENTION

Some embodiments provide an architecture for establishing multi-participant audio conferences over a computer network. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

In some embodiments, the central distributor calculates a signal strength indicator for every participant's audio signal and passes the calculated indicia along with the mixed audio signal to each participant. Some embodiments then use the signal strength indicia to display audio level meters that indicate the volume levels of the different participants. In some embodiments, the audio level meters are displayed next to each participant's picture or icon. Some embodiments use the signal strength indicia to enable audio panning.

In some embodiments, the central distributor produces a single mixed signal that includes every participant's audio. This stream (along with signal strength indicia) is sent to every participant. When playing this stream, a participant will mute playback if that same participant is the primary contributor. This scheme provides echo suppression without requiring separate, distinct streams for each participant. This scheme requires less computation from the central distributor. Also, through IP multicasting, the central distributor can reduce its bandwidth requirements.

BRIEF DESCRIPTION OF THE DRAWINGS

The novel features of the invention are set forth in the appended claims. However, for purpose of explanation, several embodiments are set forth in the following figures.

DETAILED DESCRIPTION OF THE INVENTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide an architecture for establishing multi-participant audio/video conferences. This architecture has a central distributor that receives audio signals from one or more participants. The central distributor mixes the received signals and transmits them back to participants. In some embodiments, the central distributor eliminates echo by removing each participant's audio signal from the mixed signal that the central distributor sends to the particular participant.

In some embodiments, the central distributor calculates a signal strength indicator for every participant's audio signal and passes the calculated indicia along with the mixed audio signal to each participant. Some embodiments then use the signal strength indicia to display audio level meters that indicate the volume levels of the different participants. In some embodiments, the audio level meters are displayed next to each participant's picture or icon. Some embodiments use the signal strength indicia to enable audio panning.

Several detailed embodiments of the invention are described below. In these embodiments, the central distributor is the computer of one of the participants of the audio/video conference. One of ordinary skill will realize that other embodiments are implemented differently. For instance, the central distributor in some embodiments is not the computer of any of the participants of the conference.

I. Overview

Figure 1:
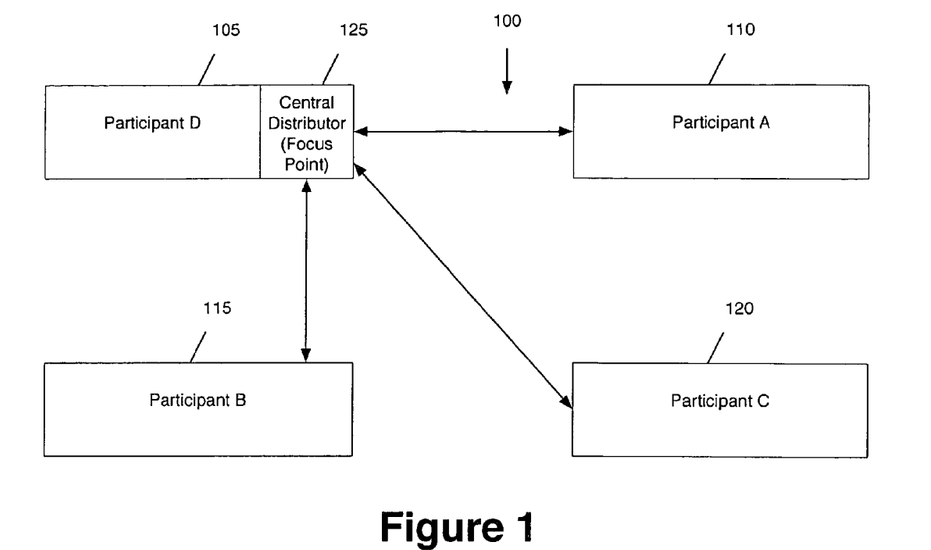
FIG. 1 illustrates an example of the audio/video conference architecture of some embodiments of the invention.

FIG. 1 illustrates an example of conference architecture 100 of some embodiments of the invention. This architecture allows multiple participants to engage in a conference through several computers that are connected by a computer network. In the example illustrated in FIG. 1, four participants A, B, C, and D are engaged in the conference through their four computers 105-120 and a network (not shown) that connects these computers. The network that connects these computers can be any network, such as a local area network, a wide area network, a network of networks (e.g., the Internet), etc.

The conference can be an audio/video conference, or an audio only conference, or an audio/video conference for some participants and an audio only conference for other participants. During the conference, the computer 105 of one of the participants (participant D in this example) serves as a central distributor of audio and/or video content (i.e., audio/video content), as shown in FIG. 1. This central distributor 125 will be referred to below as the focus point of the multi-participant conference. The computers of the other participants will be referred to below as non-focus machines or non-focus computers.

Also, the discussion below focuses on the audio operations of the focus and non-focus computers. The video operation of these computers is further described in U.S. patent application entitled "Video Processing in a Multi-Participant Video Conference", filed concurrently with this application, with the attorney docket number APLE.P0091. In addition, U.S. patent application entitled "Multi-Participant Conference Setup", filed concurrently with this application, with the attorney docket number APLE.P0084, describes how some embodiments set up a multi-participant conference through a focus-point architecture, such as the one illustrated in FIG. 1. Both these applications are incorporated herein by reference.

Figure 2:
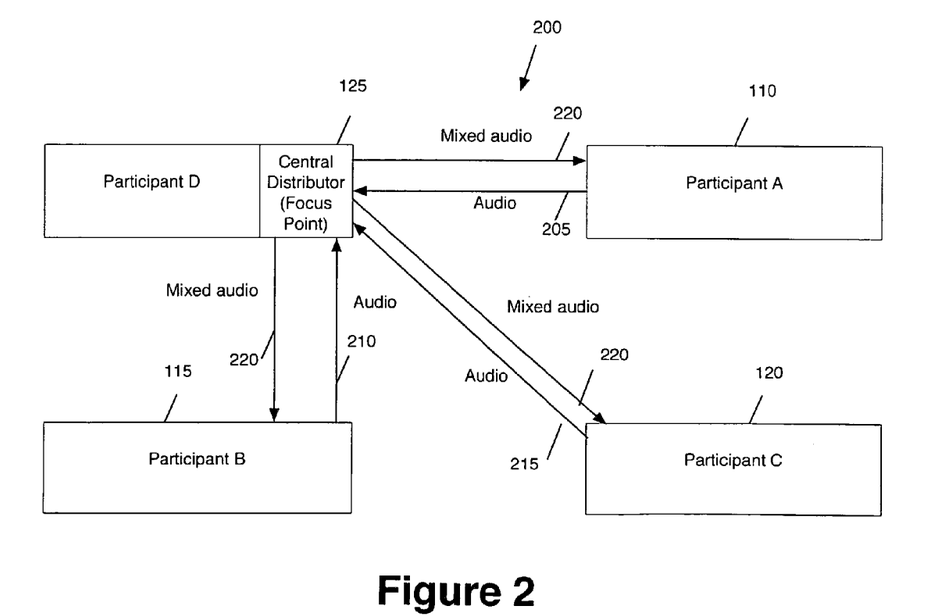
FIGS. 2 and 3 illustrate how some embodiments exchange audio content in a multi-participant audio/video conference.

As the central distributor of audio/video content, the focus point 125 receives audio signals from each participant, mixes and encodes these signals, and then transmits the mixed signal to each of the non-focus machines. FIG. 2 shows an example of such audio signal exchange for the four participant example of FIG. 1. Specifically, FIG. 2 illustrates the focus point 125 receiving compressed audio signals 205-215 from other participants. From the received audio signals 205-215, the focus point 125 generates a mixed audio signal 220 that includes each of the received audio signals and the audio signal from the participant using the focus point computer. The focus point 125 then compresses and transmits the mixed audio signal 220 to each non-focus machine 110, 115, and 120.

In the example illustrated in FIG. 2, the mixed audio signal 220 that is transmitted to each particular non-focus participant also includes the audio signal of the particular non-focus participant. In some embodiments, however, the focus point removes a particular non-focus participant's audio signal from the mixed audio signal that the focus point transmits to the particular non-focus participant. In these embodiments, the focus point 125 removes each participant's own audio signal from its corresponding mixed audio signal in order to eliminate echo when the mixed audio is played on the participant computer's loudspeakers.

Figure 3:
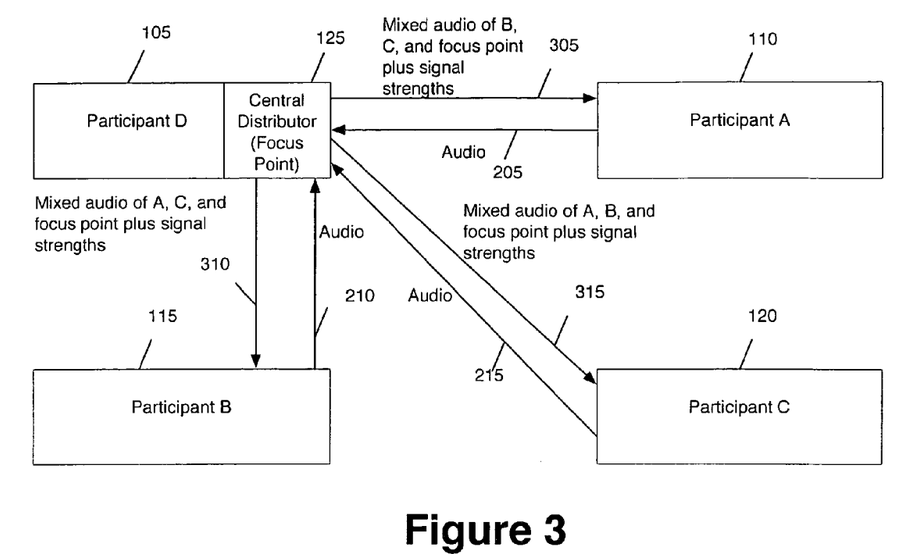

FIG. 3 illustrates an example of this removal for the example illustrated in FIG. 2. Specifically, FIG. 3 illustrates (1) for participant A, a mixed audio signal 305 that does not have participant A's own audio signal 205, (2) for participant B, a mixed audio signal 310 that does not have participant B's own audio signal 210, and (3) for participant C, a mixed audio signal 315 that does not have participant C's own audio signal 215.

As shown in FIG. 3, the focus point 125 in some embodiments calculates signal strength indicia for the participants' audio signals, and appends the signal strength indicia to the mixed signals that it sends to each participant. The non-focus computers then use the appended signal strength indicia to display audio level meters that indicate the volume levels of the different participants. In some embodiments, the audio level meters are displayed next to each participant's picture or icon.

Some embodiments also use the transmitted signal strength indicia to pan the audio across the loudspeakers of a participant's computer, in order to help identify orators during the conference. This panning creates an effect such that the audio associated with a particular participant is perceived to originate from a direction that reflects the on-screen position of that participant's image or icon. The panning effect is created by introducing small delays to the left or right channels. The positional effect relies on the brain's perception of small delays and phase differences. Audio level meters and audio panning are further described below.

Figure 4:
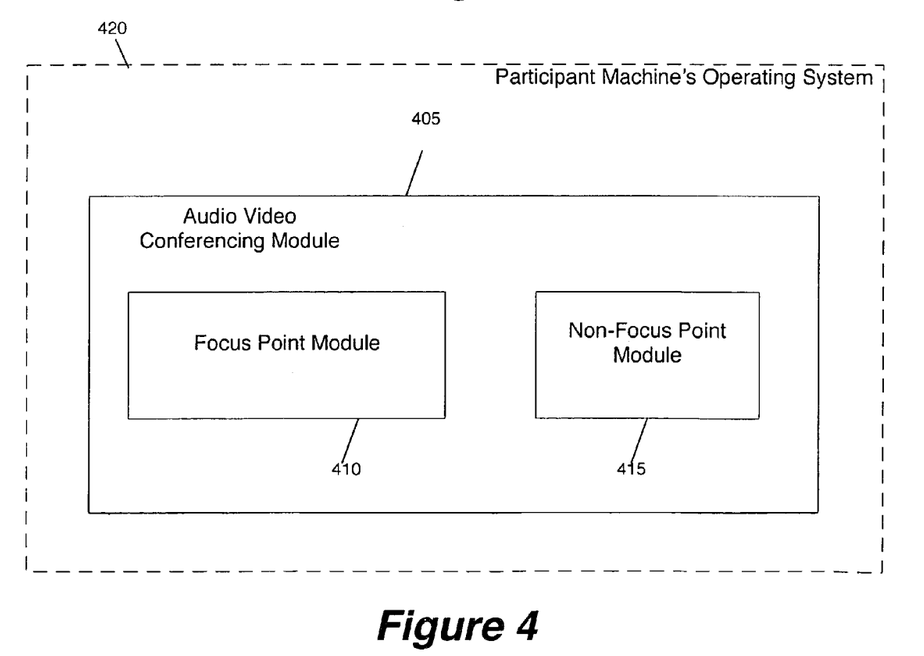
FIG. 4 shows the software components of the audio/video conferencing application of some embodiments of the invention.

Some embodiments are implemented by an audio/video conference application that can perform both focus and non-focus point operations. For example, in some embodiments, a computer readable medium may store a computer program for distributing audio content in a multi-participant audio/video conference having a central distributor of audio content. The program may include instructions. The instructions may include receiving audio signals from each participant, generating mixed audio signals from the received audio signals, and transmitting the audio signals to each participant. FIG. 4 illustrates a software architecture for one such application. Specifically, this figure illustrates an audio/video conference application 405 that has two modules, a focus point module 410 and a non-focus point module 415. Both these modules 410 and 415, and the audio/video conference application 405, run on top an operating system 420 of a conference participant's computer.

During a multi-participant conference, the audio/video conference application 405 uses the focus point module 410 when this application is serving as the focus point of the conference, or uses the non-focus point module 415 when it is not serving as the focus point. The focus point module 410 performs focus point audio-processing operations when the audio/video conference application 405 is the focus point of a multi-participant audio/video conference. On the other hand, the non-focus point module 415 performs non-focus point, audio-processing operations when the application 405 is not the focus point of the conference. In some embodiments, the focus and non-focus point modules 410 and 415 share certain resources.

The focus point module 410 is described in Section II of this document, while the non-focus point module 415 is described in Section III.

II. The Focus Point Module

Figure 5:
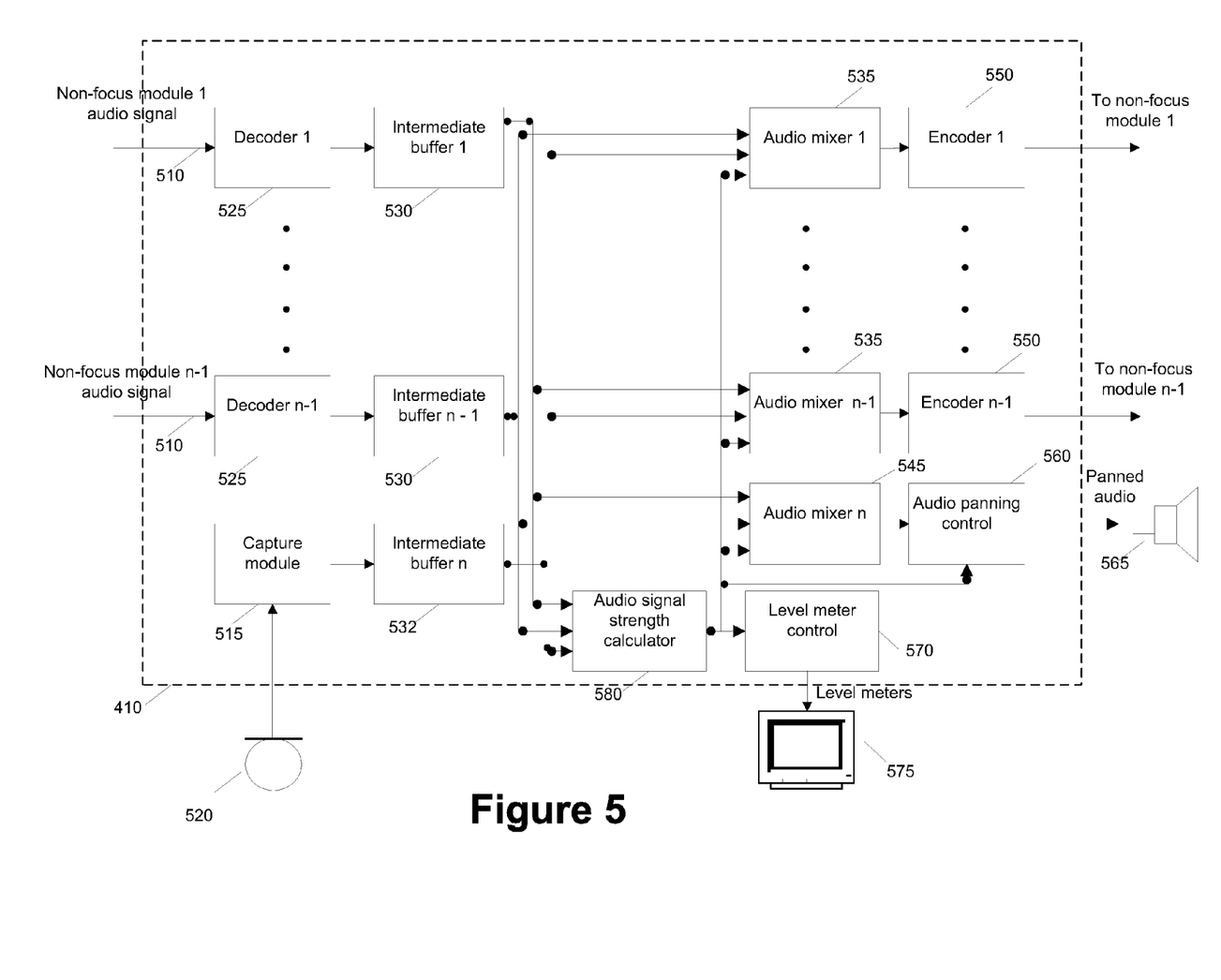
FIG. 5 illustrates the focus point module of some embodiments of the invention.

FIG. 5 illustrates the focus point module 410 of some embodiments of the invention. The focus point module 410 is shown during an audio/video conferencing with multiple participants. In order to generalize the focus point operations, the example in FIG. 5 is illustrated as having an arbitrary number of participants. This arbitrary number is denoted as "n", which represents a number greater than 2. The focus point module 410 generates mixed audio signals for transmitting to non-focus participants, and performs audio presentation for the conference participant who is using the focus point computer during the video conference. For its audio mixing operation, the focus point module 410 utilizes (1) one decoder 525 and one intermediate buffer 530 for each incoming audio signal, (2) an intermediate buffer 532 for the focus point audio signal, (3) one audio capture module 515, (3) one audio signal strength calculator 580, and (4) one audio mixer 535 for each transmitted mixed audio signal, and one encoder 550 for each transmitted mixed audio signal. For its audio presentation operation at the focus-point computer, the focus point module 410 also utilizes one audio mixer 545, one audio panning control 560 and one level meter control 570.

Figure 6:
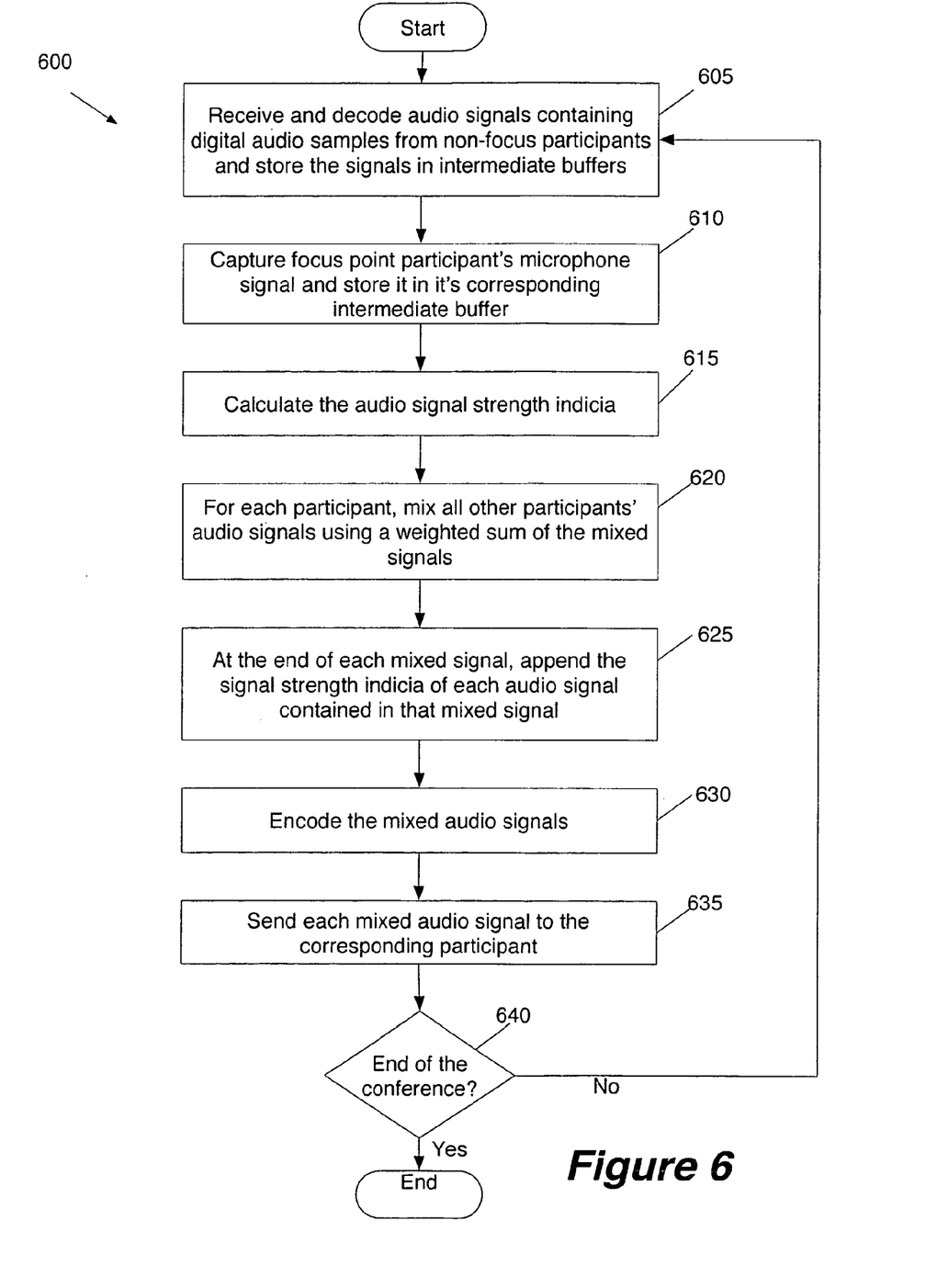
FIG. 6 is a flow chart showing mixed audio generation by the focus point in some of the embodiments.

The audio mixing operation of the focus point module 410 will now be described by reference to the mixing process 600 that conceptually illustrates the flow of operation in FIG. 6. The audio presentation operation of the focus point module is described in Section III below, along with the non-focus point module's audio presentation.

During the audio mixing process 600, two or more decoders 525 receive (at 605) two or more audio signals 510 containing digital audio samples from two or more non-focus point modules. In some embodiments, the received audio signals are encoded by the same or different audio codecs at the non-focus computers. Examples of such codecs include Qualcomm PureVoice, GSM, G.711, and ILBC audio codecs.

The decoders 525 decode and store (at 605) the decoded audio signals in two or more intermediate buffers 530. In some embodiments, the decoder 525 for each non-focus computer's audio stream uses a decoding algorithm that is appropriate for the audio codec used by the non-focus computer. This decoder is specified during the process that sets up the audio/video conference.

The focus point module 410 also captures audio from the participant that is using the focus point computer, through microphone 520 and the audio capture module 515. Accordingly, after 605, the focus point module (at 610) captures an audio signal from the focus-point participant and stores this captured audio signal in its corresponding intermediate buffer 532.

Next, at 615, the audio signal strength calculator 580 calculates signal strength indicia corresponding to the strength of each received signal. Audio signal strength calculator 580 assigns a weight to each signal. In some embodiments, the audio signal strength calculator 580 calculates the signal strength indicia as the Root Mean Square (RMS) power of the audio stream coming from the participant to the focus point. The RMS power is calculated from the following formula:

$$RMS = \sqrt{\frac{\sum_{i=1}^{N}(Sample_i)^2}{N}},$$

where N is the number of samples used to calculate the RMS power and Sample, is the $i^{th}$ sample's amplitude. The number of samples, N, that audio signal strength calculator 580 uses to calculate RMS value depends on the sampling rate of the signal. For example, in some embodiments of the invention where the sampling rate is 8 KHz, the RMS power might be calculated using a 20 ms chunk of audio data containing 160 samples. Other sampling rates may require a different number of samples.

Next, at 620, process 600 utilizes the audio mixers 535 and 545 to mix the buffered audio signals. Each audio mixer 535 and 545 generates mixed audio signals for one of the participants. The mixed audio signal for each particular participant includes all participants' audio signals except the particular participant's audio signal. Eliminating a particular participant's audio signal from the mix that the particular participant receives eliminates echo when the mixed audio is played on the participant computer's loudspeakers. The mixers 535 and 545 mix the audio signals by generating (at 620) a weighted sum of these signals. To obtain an audio sample value at a particular sample time in a mixed audio signal, all samples at the particular sampling time are added based on the weight values computed by the audio signal strength calculator 580. In some embodiments, the weights are dynamically determined based on signal strength indicia calculated at 615 to achieve certain objectives. Example of such objectives include (1) the elimination of weaker signals, which are typically attributable to noise, and (2) the prevention of one participant's audio signal from overpowering other participants' signals, which often results when one participant consistently speaks louder than the other or has better audio equipment than the other.

Figure 7:
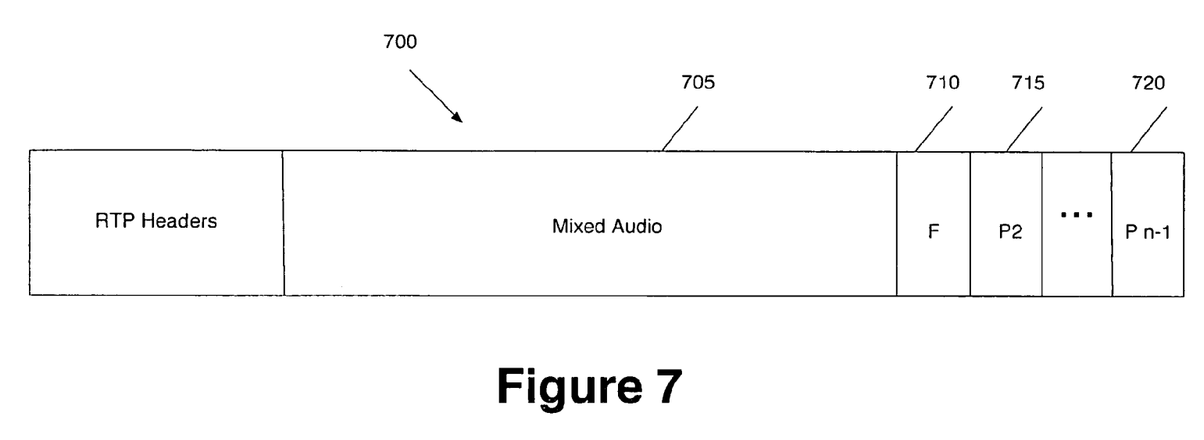
FIG. 7 illustrates how the RTP protocol is used by the focus point module in some embodiments to transmit audio content.

In some embodiments, the mixers 535 and 545 append (at 625) the signal strength indicia of all audio signals that were summed up to generate the mixed signal. For instance, FIG. 7 illustrates an RTP (Real-time Transport Protocol) audio packet 700 that some embodiments use to send a mixed audio signal 705 to a particular participant. As shown in this figure, signal strength indicia 710-720 are attached to the end of the RTP packet 705.

Next, for the non-focus computers' audio, the encoders 550 (at 630) encode the mixed audio signals and send them (at 635) to their corresponding non-focus modules. The mixed audio signal for the focus point computer is sent (at 635) unencoded to focus point audio panning control 560. Also, at 635, the signal strength indicia is sent to the level meter 570 of the focus point module, which then generates the appropriate volume level indicators for display on the display device 575 of the focus point computer.

After 635, the audio mixing process 600 determines (at 640) whether the multi-participant audio/video conference has terminated. If so, the process 600 terminates. Otherwise, the process returns to 605 to receive and decode incoming audio signals.

One of ordinary skill will realize that other embodiments might implement the focus point module 410 differently. For instance, in some embodiments, the focus point 410 produces a single mixed signal that includes every participant's audio. This stream along with signal strength indicia is sent to every participant. When playing this stream, a participant will mute playback if that same participant is the primary contributor. This scheme saves focus point computing time and provides echo suppression without requiring separate, distinct streams for each participant. Also, during IP multicast, the focus point stream bandwidth can be reduced. In these embodiments, the focus point 410 has one audio mixer 535 and one encoder 550.

III. The Non-Focus Point Module

Figure 8:
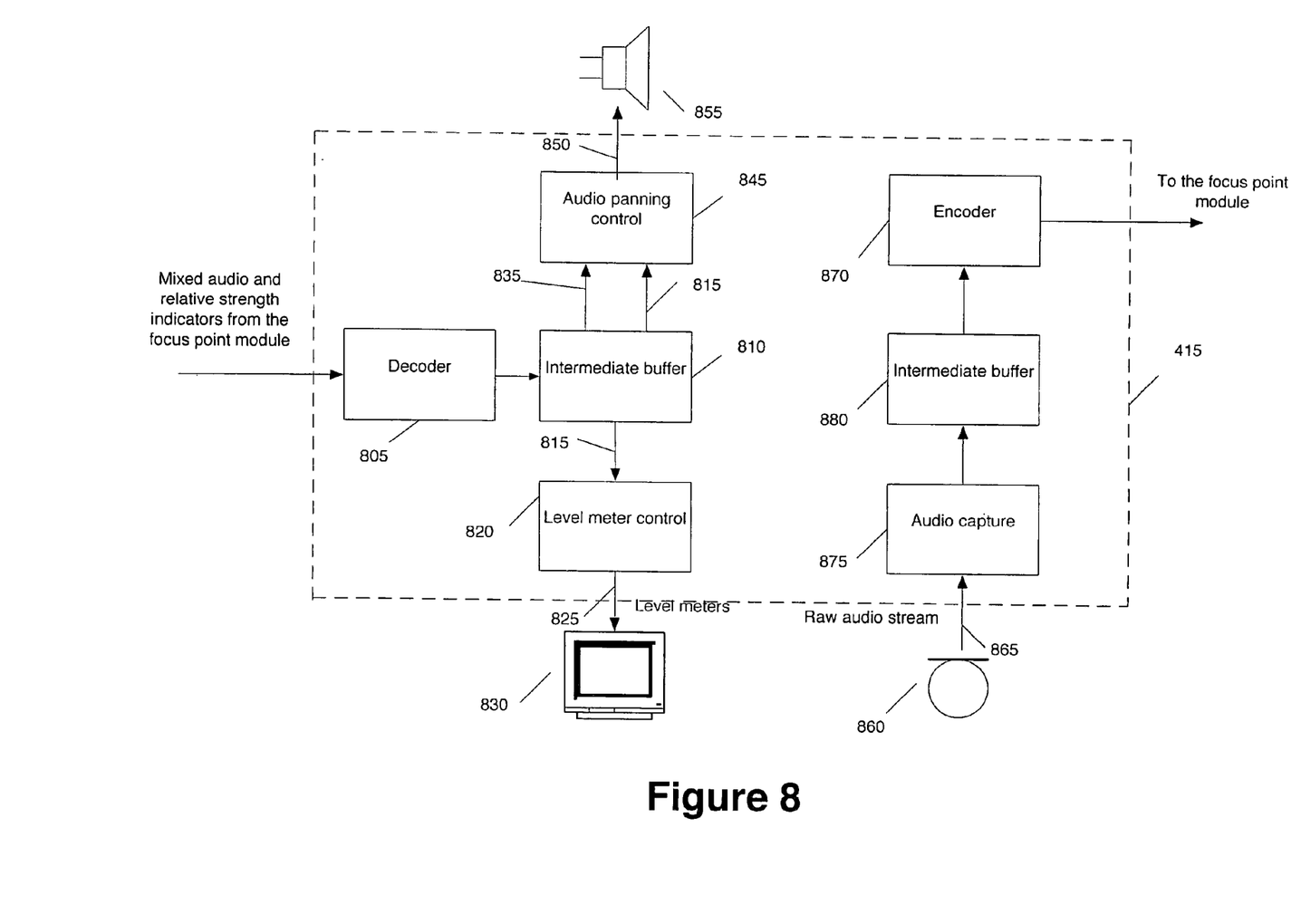
FIG. 8 illustrates the non-focus point of some embodiments of the invention.

FIG. 8 illustrates a non-focus point module 415 of an audio/video conference of some embodiments of the invention. In this example, the non-focus point module 415 utilizes a decoder 805, two intermediate buffers 810 and 880, a level meter control 820, an audio panning control 845, an audio capture module 875, and an encoder 870.

The non-focus point module performs encoding and decoding operations. During the encoding operation, the audio signal of the non-focus point participant's microphone 860 is captured by audio capture module 875 and is stored in its corresponding intermediate buffer 880. The encoder 870 then encodes the contents of the intermediate buffer 880 and sends it to the focus point module 410.

Figure 9:
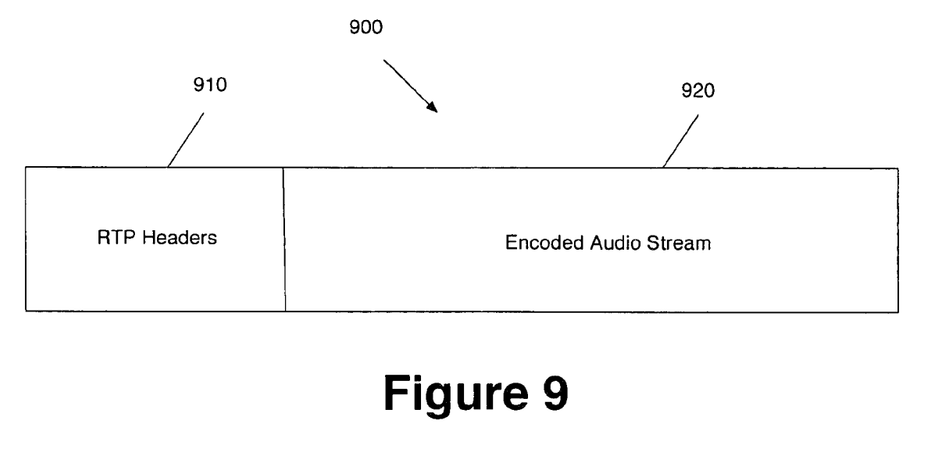
FIG. 9 illustrates how the RTP protocol is used by the non-focus point module in some embodiments to transmit audio content FIG. 10 conceptually illustrates the flow of non-focus point decoding operation in some embodiments.

In some embodiments that use Real-time Transport Protocol (RTP) to exchange audio signals, the non-focus participant's encoded audio signal is sent to the focus point module in a packet 900 that includes RTP headers 910 plus encoded audio 920, as shown in FIG. 9.

Figure 10:
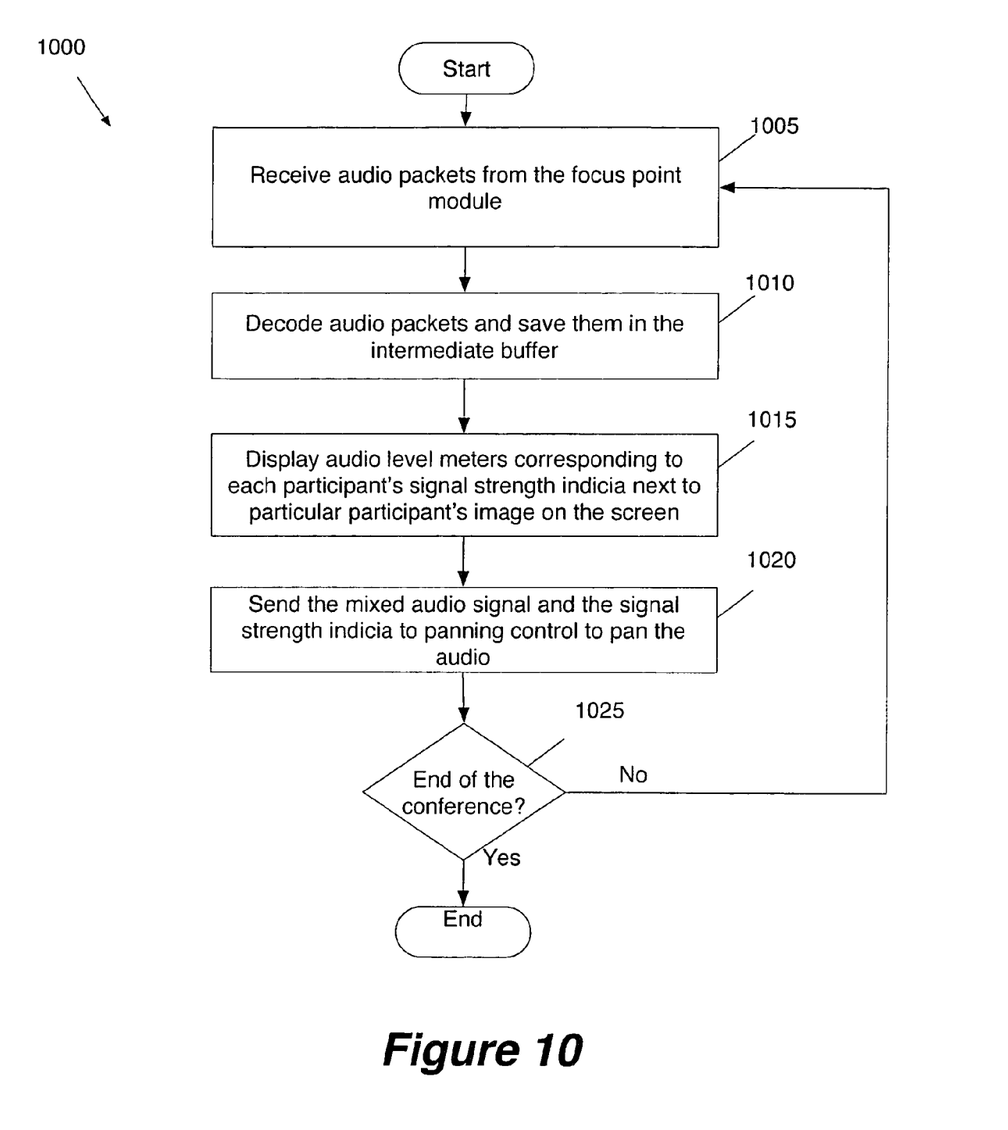

The decoding operation of the non-focus point module 415 will now be described by reference to the process 1000 that conceptually illustrates the flow of operation in FIG. 10. During the decoding operation, the decoder 805 receives (at 1005) audio packets from the focus point module 410. The decoder 805 decodes (at 1010) each received audio packet to obtain mixed audio data and the signal strength indicia associated with the audio data. The decoder 805 saves (at 1010) the results in the intermediate buffer 810.

The signal strength indicia are sent to level meter control 820 to display (at 1015) the audio level meters on the non-focus participant's display 830. In a multi-participant audio/video conference, it is desirable to identify active speakers. One novel feature of the current invention is to represent the audio strengths by displaying audio level meters corresponding to each speaker's voice strength. Level meters displayed on each participant's screen express the volume level of the different participants while the mixed audio signal is being heard from the loud speakers 855. Each participant's volume level can be represented by a separate level meter, thereby, allowing the viewer to know the active speakers and the audio level from each participant at any time.

Figure 11:
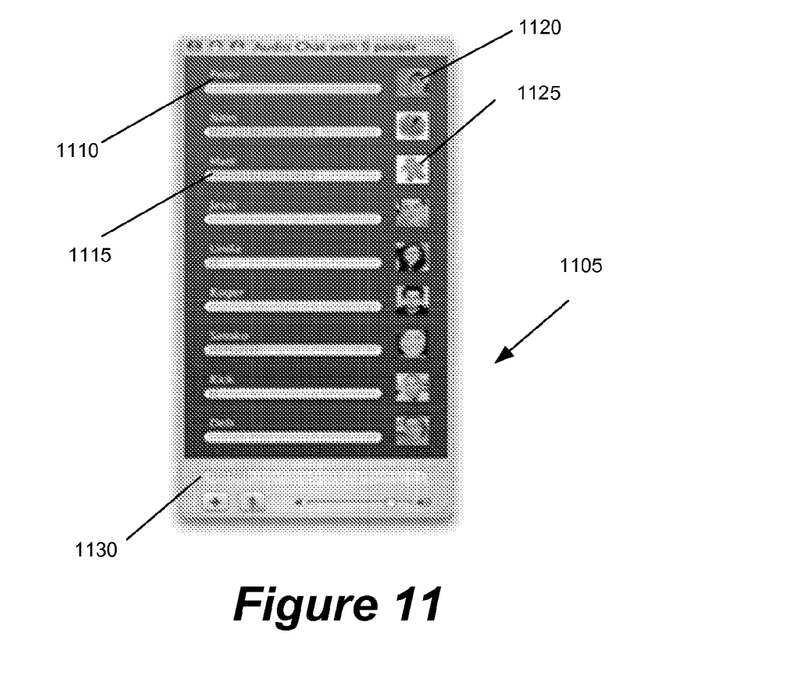
FIG. 11 illustrates the audio level meters displayed on some embodiments of the invention.

The level meters are particularly useful when some participants only receive audio signals during the conference (i.e., some participants are "audio only participants"). Such participants do not have video images to help provide a visual indication of the participants that are speaking. FIG. 11 illustrates an example of the use of level meters in an audio only conference of some embodiments. In this figure, each participant's audio level 1110-1115 is placed next to that participant's icon 1120-1125. As illustrated in FIG. 11, some embodiments display the local microphone's voice level 1130 separately at the bottom of the screen. One of ordinary skill in the art should realize that FIG. 11 is just one example of the way to show the level meters on a participant's display. Other display arrangements can be made without deviating from the teachings of this invention for calculating and displaying the relative strength of audio signals in a conference.

After 1015, the decoded mixed audio signal and signal strength indicia stored in the intermediate buffer 810 are sent (at 1020) to the audio panning control 845 to control the non-focus participant's loudspeakers 855. The audio panning operation will be further described below by reference to FIGS. 12 and 13.

After 1020, the audio decoding process 1000 determines (at 1025) whether the multi-participant audio/video conference has terminated. If so, the process 1000 terminates. Otherwise, the process returns to 1005 to receive and decode incoming audio signals.

Figure 12:
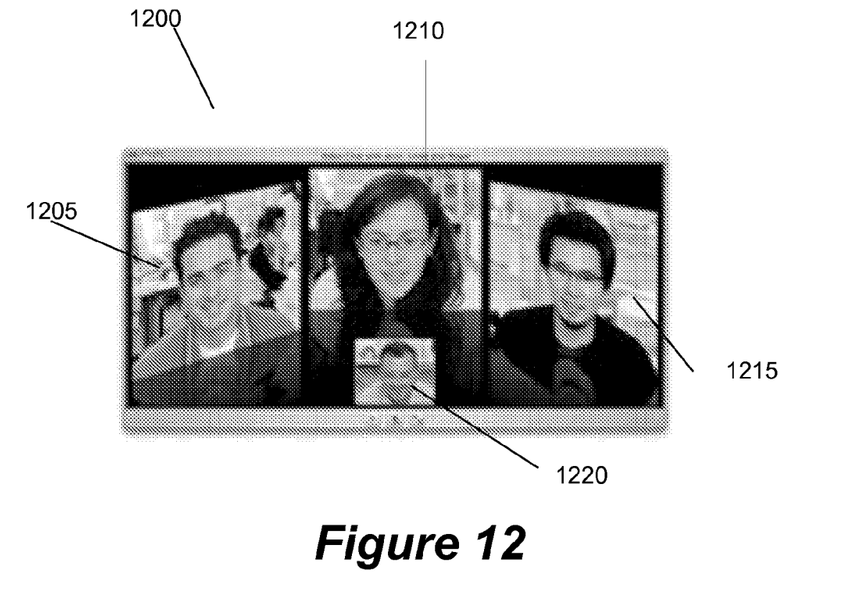
FIG. 12 shows an exemplary arrangement of participants' images on one of the participants' display.

The use of audio panning to make the perceived audio location match the video location is another novel feature of the current invention. In order to illustrate how audio panning is performed, FIG. 12 illustrates an example of a video-conference display presentation 1200 in the case of four participants in a video conference. As shown in FIG. 12, the other three participants' images 1205-1215 are displayed horizontally in the display presentation 1200. The local participant's own image 1220 is optionally displayed with a smaller size relative to the other participants' images 1205-1215 at the bottom of the display presentation 1200.

Some embodiments achieve audio panning through a combination of signal delay and signal amplitude adjustment. For instance, when the participant whose image 1205 is placed on the left side of the screen speaks, the audio coming from the right speaker is changed by a combination of introducing a delay and adjusting the amplitude to make the feeling that the voice is coming from the left speaker.

Figure 13:
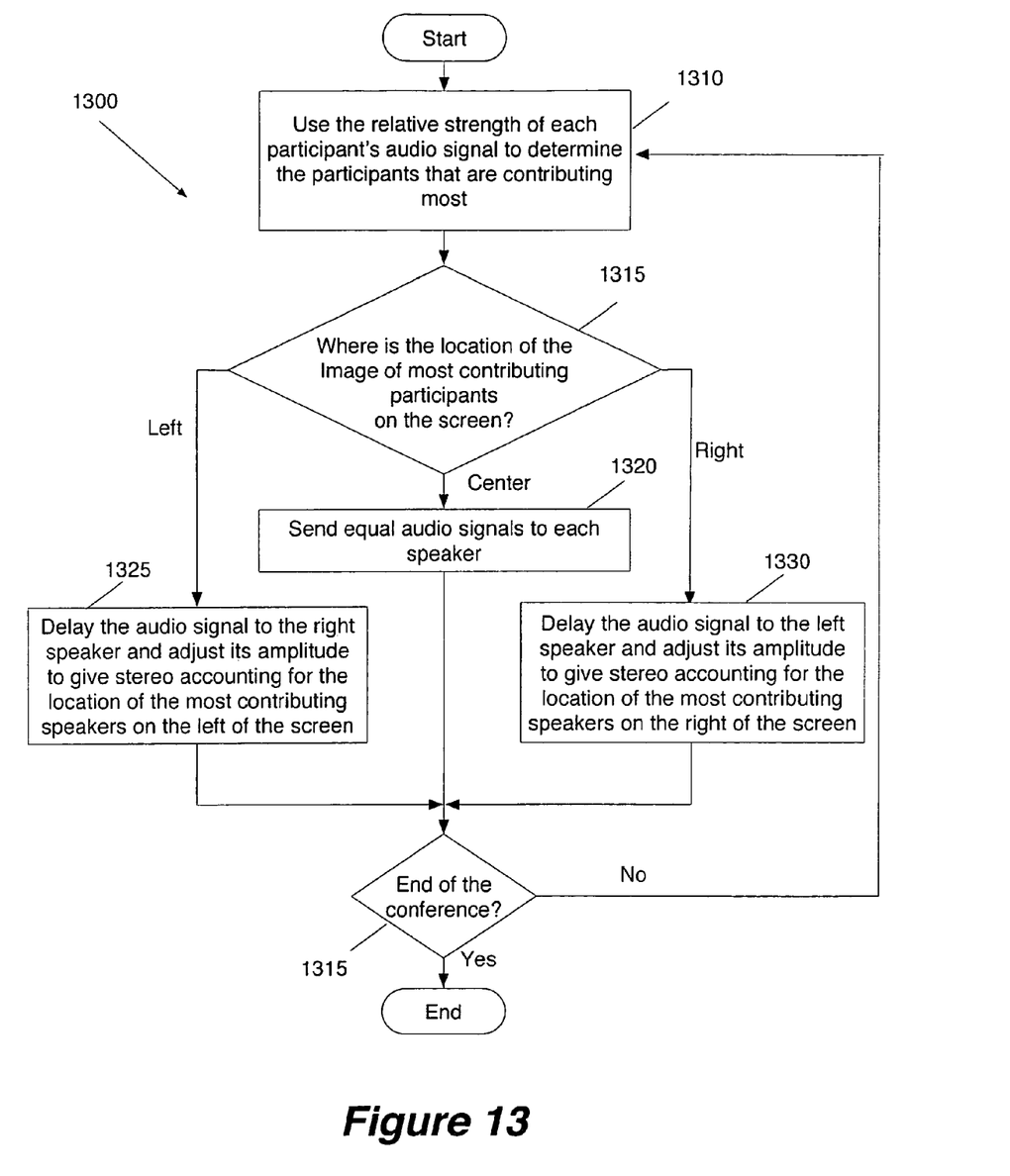
FIG. 13 is a flow chart illustrating the process by which some embodiments of the invention perform audio panning.

FIG. 13 illustrates a process 1300 by which the audio panning control of the non-focus module 845 operate in some embodiments of the invention. The signal strength indicia of each audio signal in the mixed audio signal is used (at 1310) to identify the most-contributing participant in the decoded mixed audio signal. Next, the process identifies (at 1315) the location of the participant or participants identified at 1310. The process then uses (at 1320-1330) a combination of amplitude adjustment and signal delay to create the stereo effect. For example, if the participant whose image 1205 is displayed on the left side of the displaying device 1200 is currently speaking, a delay is introduced (at 1325) on the right loudspeaker and the amplitude of the right loudspeaker is optionally reduced to make the signal from the left loudspeaker appear to be stronger.

Similarly, if the participant whose image 1215 is displayed on the right side of the displaying device 1200 is currently speaking, a delay is introduced (at 1330) on the left loudspeaker and the amplitude of the left loudspeaker is optionally reduced to make the signal from the right loudspeaker appear to be stronger. In contrast, if the participant whose image 1210 is displayed on the center of the displaying device 1200 is currently speaking, no adjustments are done to the signals sent to the loudspeakers.

Audio panning helps identify the location of the currently speaking participants on the screen and produces stereo accounting for location. In some embodiments of the invention, a delay of about 1 millisecond ($1/1000$ second) is introduced and the amplitude is reduced by 5 to 10 percent during the audio panning operation. One of ordinary skill in the art, however, will realize that other combinations of amplitude adjustments and delays might be used to create a similar effect.

In some embodiments, certain participant actions such as joining conference, leaving conference, etc. can trigger user interface sound effects on other participants' computers. These sound effects may also be panned to indicate which participant performed the associated action.

In the embodiments where the focus point is also a conference participant (such as the embodiment illustrated in FIG. 1), the focus point module also uses the above-described methods to present the audio for the participant whose computer serves as the conference focus point.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. Thus, one of ordinary skill in the art would understand that the invention is not limited by the foregoing illustrative details, but rather is to be defined by the appended claims.

What claimed is:

1. A non-transitory computer readable medium of a device of a first participant of a multi-participant conference, the computer readable medium storing a computer program which when executed by at least one processor of the device distributes audio content in a multi-participant conference, the computer program comprising sets of instructions to:
    receive audio signals from at least second and third participants of the conference;
    generate data representative of strengths of the received audio signals;
    generate mixed audio signals from the received audio signals;
    to each mixed audio signal, appending a set of the generated strength data for the audio signals that are mixed to produce each mixed audio signal; and
    transmit the mixed audio signals with the strength data to the second and third participants of the conference.

2. The non-transitory computer readable medium of claim 1, wherein the computer program further comprises a set of instructions to determine a strength of each received audio signal, wherein the set of instructions to determine the strength comprise a set of instructions to calculate the strength of each received audio signal as a root mean square (RMS) power of the received audio signal.

3. The non-transitory computer readable medium of claim 1, wherein the set of instructions to generate a mixed audio signal for a participant of the multi-participant conference comprises a set of instructions to remove the audio signal of the participant.

4. The non-transitory computer readable medium of claim 1, wherein the appended strength data is configured to be used by devices of the second and third participants to pan the mixed audio signal across audio loudspeakers.

5. The non-transitory computer readable medium of claim 1, wherein the set of instructions to generate the mixed audio signals comprises a set of instructions to generate a first mixed audio signal for the second participant and generating a second, different mixed audio signal for the third participant.

6. The non-transitory computer readable medium of claim 1, wherein the mixed audio signals are transmitted using real time protocol (RTP) packets comprising the strength data for each of the audio signals in the mixed audio signals.

7. The non-transitory computer readable medium of claim 1, wherein the computer program comprises a set of instructions to locally output the mixed audio signals at the device of the first participant.

8. A method of distributing audio content in a multi-participant conference, the method comprising:
at a device of a first participant of the conference:
receiving audio signals from at least second and third participants of the conference;
generating a single mixed audio signal comprising an audio signal locally captured by the device of the first participant and the received audio signals;
transmitting the mixed audio signal to the second and third participants; and
removing the audio signal of the device of the first participant from the mixed audio signal in order to locally output the mixed audio signal with audio signal locally captured by the device of the first participant removed.

9. The method of claim 8 comprising generating strength data that represents strengths of (i) the audio signal captured by the device of the first participant and (ii) each of the received audio signals.

10. The method of claim 9, wherein the strength data comprises the strength of each of the audio signals as a root mean square (RMS) of the audio signals.

11. The method of claim 8, wherein the single mixed audio signal is generated by the device of the first participant using the audio signals of the first, second, and third participants.

12. The method of claim 8 further comprising locally outputting the mixed audio signal without the audio signal captured by the device of the first participant.

13. The method of claim 9, wherein the strength data is for panning the mixed audio signal across audio loudspeakers of the device of the first participant and devices associated with the second and third participants.

14. The method of claim 8, wherein the device generates, during the conference, the mixed audio signal, a second mixed audio signal to be provided to the second participant with the received audio signal of the second participant removed, a third mixed audio signal to be provided to the third participant with the received audio signal of the third participant removed, wherein devices associated with the second and third participants do not generate any mixed audio signals during the conference.

15. A non-transitory computer readable medium of a first device of a first participant of a multi-participant conference, the computer readable medium storing a computer program which when executed by at least one processor of the device receives audio content in a multi-participant conference, the computer program comprising sets of instructions to:
receive a mixed audio signal from a second device of a second participant of the conference, the mixed audio signal comprising (i) an audio signal sent from the first device captured by the first device and sent to the second device, (ii) audio captured by the second device, and (iii) an audio signal captured by a third device and sent to the second device;
remove the audio signal of the first device from the mixed audio signal; and
output the mixed audio signal at the first device with the audio signal of the first device removed.

16. The non-transitory computer readable medium of claim 15, wherein the computer program comprises a set of instructions to send the audio signal of the first device to the second device of the second participant.

17. The non-transitory computer readable medium of claim 15, wherein the computer program comprises a set of instructions to receive strength data that represents strengths of audio signals received at the second device of the second participant.

18. The non-transitory computer readable medium of claim 17, wherein the set of instructions to output the mixed audio signal comprises a set of instructions to use the strength data is to pan the mixed audio signal across audio loudspeakers of the first device.

19. The non-transitory computer readable medium of claim 17, wherein the strength data is generated by the second device by calculating a strength of each audio signal of the mixed audio signal as a root mean square (RMS) power of the audio signal.

20. The non-transitory computer readable medium of claim 15, wherein the second device generates mixed audio signals during the conference and the first and third devices do not generate mixed audio signals during the conference.

* * * * *